United States Patent
Huang

(10) Patent No.: US 10,706,363 B2
(45) Date of Patent: Jul. 7, 2020

(54) DATA RECOMMENDATION METHOD AND DEVICE, AND STORAGE MEDIUM

(71) Applicant: Tencent Technology (Shenzhen) Company Limited, Shenzhen (CN)

(72) Inventor: Anbu Huang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 177 days.

(21) Appl. No.: 16/049,352

(22) Filed: Jul. 30, 2018

(65) Prior Publication Data

US 2018/0365577 A1 Dec. 20, 2018

Related U.S. Application Data

(63) Continuation-in-part of application No. PCT/CN2017/083524, filed on May 8, 2017.

(30) Foreign Application Priority Data

May 12, 2016 (CN) .......................... 2016 1 0316826

(51) Int. Cl.
  *G06F 15/16* (2006.01)
  *G06N 5/04* (2006.01)
  (Continued)

(52) U.S. Cl.
  CPC ............... *G06N 5/04* (2013.01); *G06N 5/046* (2013.01); *G06N 20/20* (2019.01);
  (Continued)

(58) Field of Classification Search
  CPC ...... G06F 16/00; G06N 20/20; G06N 3/0445; G06N 5/003; G06N 5/04; G06N 5/046;
  (Continued)

(56) References Cited

U.S. PATENT DOCUMENTS 7,373,318 B2 * 5/2008 Kutsumi ............ G06Q 30/0631
                                                    705/26.7
9,071,649 B2 * 6/2015 Tekwani ................. H04L 67/30
(Continued)

FOREIGN PATENT DOCUMENTS

CN       103118111 A   *   5/2013
CN       103118111 A       5/2013
(Continued)

OTHER PUBLICATIONS

Tencent Technology, ISRWO, PCT/CN2017/083524, dated Jul. 26, 2017, 9 pgs.
(Continued)

*Primary Examiner* — Moustafa M Meky
*Assistant Examiner* — Thorne E Waugh
(74) *Attorney, Agent, or Firm* — Morgan, Lewis & Bockius LLP

(57) ABSTRACT

Servers for a content provider are organized into three architectural layers that operate on three distinct time scales, including an offline layer, an intermediate layer, and a real-time layer. The servers (e.g., on the intermediate layer) obtain a periodic service attribute corresponding to a terminal identifier of a user terminal and a real-time service attribute corresponding to the terminal identifier. The servers (e.g., on the intermediate layer) select recommended content in a content data set of the content provider according to the periodic service attribute and the real-time service attribute, wherein selection is performed in the intermediate layer with a time scale between the update cycle of the offline layer and the response time requirement of the real-time layer, and corresponding selection processes are performed on an on-demand basis for a plurality of terminal identifiers corresponding to user terminals that are currently actively engaged in interaction with the real-time layer.

20 Claims, 5 Drawing Sheets

(51) Int. Cl.
*G06N 20/20* (2019.01)
*G06Q 30/06* (2012.01)
*G06Q 30/02* (2012.01)
*H04L 29/08* (2006.01)
*G06N 3/04* (2006.01)
*G06N 5/00* (2006.01)

(52) U.S. Cl.
CPC ..... *G06Q 30/0282* (2013.01); *G06Q 30/0631* (2013.01); *H04L 67/26* (2013.01); *H04L 67/306* (2013.01); *G06N 3/0445* (2013.01); *G06N 5/003* (2013.01)

(58) Field of Classification Search
CPC ............ G06Q 30/0282; G06Q 30/0631; H04L 67/26; H04L 67/306
See application file for complete search history.

(56) References Cited

U.S. PATENT DOCUMENTS

| | | | | |
|---|---|---|---|---|
| 9,390,181 | B1* | 7/2016 | Kotas | G06F 16/9535 |
| 9,779,443 | B1* | 10/2017 | Chittoor | G06Q 30/0631 |
| 9,922,360 | B2* | 3/2018 | Hendrick | G06Q 30/0631 |
| 2001/0028662 | A1* | 10/2001 | Hunt | G06Q 30/02 |
| | | | | 370/487 |
| 2004/0193938 | A1* | 9/2004 | Shah | H04L 1/22 |
| | | | | 714/2 |
| 2009/0163183 | A1* | 6/2009 | O'Donoghue | G06Q 30/02 |
| | | | | 455/414.1 |
| 2011/0125585 | A1* | 5/2011 | Dow | G06Q 30/02 |
| | | | | 705/14.66 |
| 2012/0066393 | A1 | 3/2012 | Tekwani | |
| 2012/0173370 | A1* | 7/2012 | Soroca | G06Q 30/0241 |
| | | | | 705/26.3 |
| 2012/0310770 | A1* | 12/2012 | Cacheda Seijo | G06Q 30/00 |
| | | | | 705/26.7 |
| 2015/0006286 | A1* | 1/2015 | Liu | G06Q 50/01 |
| | | | | 705/14.53 |
| 2015/0006294 | A1* | 1/2015 | Irmak | G06Q 50/01 |
| | | | | 705/14.66 |
| 2016/0063065 | A1* | 3/2016 | Khatri | G06Q 30/02 |
| | | | | 707/723 |
| 2017/0193106 | A1* | 7/2017 | Chang | G06F 16/735 |
| 2017/0289202 | A1* | 10/2017 | Krasadakis | H04L 67/02 |
| 2018/0293625 | A1* | 10/2018 | Sangoi | G06Q 30/0601 |

FOREIGN PATENT DOCUMENTS

| | | |
|---|---|---|
| CN | 104090894 A | 10/2014 |
| CN | 104424210 A | 3/2015 |
| CN | 105959374 A | 9/2016 |

OTHER PUBLICATIONS

Tencent Technology, IPRP, PCT/CN2017/083524, dated Nov. 13, 2018, 8 pgs.

* cited by examiner

DATA RECOMMENDATION METHOD AND DEVICE, AND STORAGE MEDIUM

PRIORITY CLAIMS AND RELATED APPLICATIONS

This application is a continuation-in-part of PCT application number: PCT/CN2017/083524, entitled "DATA RECOMMENDATION METHOD AND DEVICE", filed with the Chinese Patent Office on May 8, 2017, which claims priority to Chinese Patent Application No. 201610316826.8, entitled "DATA RECOMMENDATION METHOD AND DEVICE" filed by the applicant, TENCENT TECHNOLOGY (SHENZHEN) COMPANY LIMITED, on May 12, 2016, both of which are incorporated by reference in their entirety.

FIELD OF THE TECHNOLOGY

The present disclosure relates to the field of computer technologies, and in particular, to a data recommendation method and device, and a storage medium.

BACKGROUND OF THE DISCLOSURE

With continuous development and improvement of computer technologies, in a process of using a terminal application, a background server not only ensures normal running of the terminal application, but also recommends related service data. For example, a music application recommends a daily selected song, or a shopping application recommends a hot product, thereby improving user experience.

An existing recommendation architecture is formed by two parts: an offline layer and a real-time layer. The offline layer is responsible for collecting behavior operations of users for current services in a period of time, to calculate a periodic service attribute such as a label attribute of each user or similar data, and also needs to be responsible for selecting recommendation service data. The real-time layer is responsible for further filtering the recommendation service data, and outputting the filtered service data to a user terminal, and also needs to perform feedback learning according to real-time behavior operations of the users for the current services, to generate a real-time service attribute such as a real-time label attribute of each user. Because the offline layer has a large calculation burden, the update efficiency of the recommendation service data is easily affected, and because a cycle for the offline layer to generate the recommendation service data is long, and a service attribute obtained by the real-time layer through real-time feedback learning usually cannot take effect until the offline layer selects the recommendation service data next time, the recommendation service data cannot be adjusted in real time, thereby affecting the effect of service data recommendation.

SUMMARY

Embodiments of the present disclosure provide a data recommendation method and device, and a storage medium based on a three-layer architecture, so that recommendation service data can be generated in an intermediate layer in real time based on periodic service attribute data provided by an offline layer and real-time service attribute data provided by a real-time layer, the update efficiency of the recommendation service data can be improved, and the effect of service data recommendation can be improved.

In one aspect, a plurality of servers for a content provider are organized into three architectural layers that operate on three distinct time scales, including an offline layer, an intermediate layer, and a real-time layer. The servers (e.g., on the intermediate layer) obtain a periodic service attribute corresponding to a terminal identifier of a user terminal and a real-time service attribute corresponding to the terminal identifier. The periodic service attribute is a first label attribute relevant for content recommendation that corresponds to the terminal identifier. The first label attribute is obtained through calculation according to a first type of service operations for content that have been performed under the terminal identifier in a first preset period of time. The real-time service attribute is a second label attribute relevant for content recommendation that corresponds to the terminal identifier. The second label attribute is obtained through calculation according to a second type of service operations for content that have been performed under the terminal identifier in real time corresponding to a response time requirement of the real-time layer. The servers (e.g., on the intermediate layer) select at least one piece of recommended content in a content data set according to the periodic service attribute and the real-time service attribute. The servers (e.g., the real-time layer) send the at least one piece of recommended content to the user terminal as recommended content to the user of the user terminal.

According to a second aspect of the present disclosure, a system includes one or more processors, memory, a display, a touch-sensitive surface, and a plurality of instructions stored in the memory that, when executed by the one or more processors, cause the system to perform the aforementioned method.

According to a third aspect of the present disclosure, a non-transitory computer readable storage medium storing a plurality of instructions configured for execution by a system having one or more processors, the plurality of instructions causing the system to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

In the embodiments of the present disclosure, a periodic service attribute of an offline layer and a real-time service attribute of a real-time layer are obtained, and recommendation service data in a service data set is selected in real time, and pushed to a user terminal. A process of generating recommendation service data in real time based on service attributes provided by an offline layer and a real-time layer is implemented, the update efficiency of the recommendation service data is improved, the effect of service data recommendation is improved, and work of service data selection of the offline layer and service data recommendation of the real-time layer is shared, thereby improving the work efficiency of the service data recommendation.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary

DESCRIPTION OF EMBODIMENTS

Figure 1:
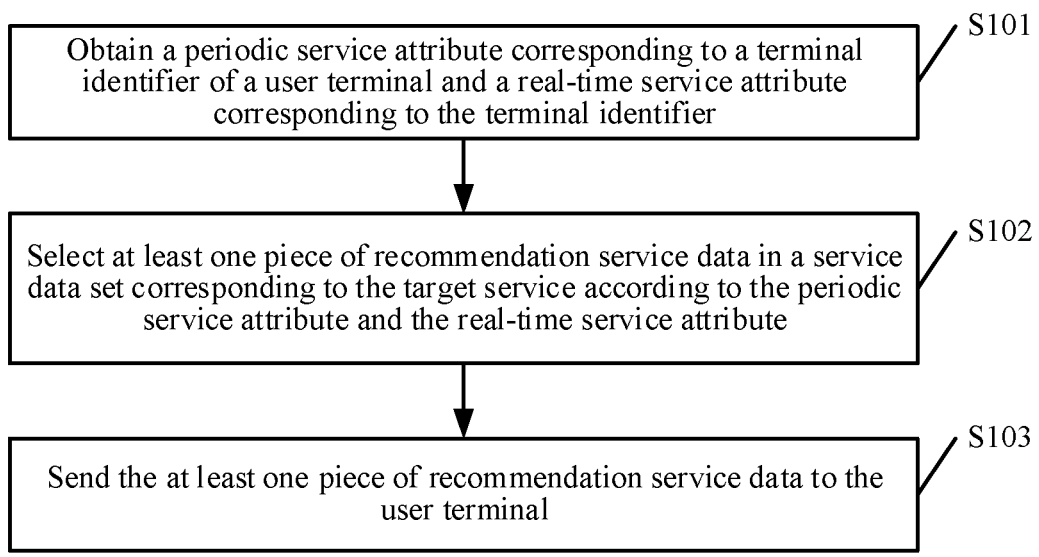
FIG. 1 is a schematic flowchart of a data recommendation method according to an embodiment of the present disclosure.

The following clearly and completely describes the technical solutions in the embodiments of the present disclosure with reference to the accompanying drawings in the embodiments of the present disclosure. Obviously, the described embodiments are only some embodiments instead of all embodiments of the present disclosure. All other embodiments obtained by a person of ordinary skill in the art based on the embodiments in the present disclosure without creative effects shall fall within the protection scope of the present disclosure.

A data recommendation method provided in the embodiments of the present disclosure may be applied to a scenario of music data recommendation, for example, a scenario in which a data recommendation device obtains a periodic music label attribute that corresponds to a terminal identifier of a user terminal and that is in a music application and a real-time music label attribute corresponding to the terminal identifier, the data recommendation device selects at least one piece of recommendation music data in the music data set according to the periodic music label attribute and the real-time music label attribute, and the data recommendation device sends the at least one piece of recommendation music data to the user terminal; or may be applied to a scenario of product data recommendation, for example, a scenario in which a data recommendation device obtains a periodic product label attribute that corresponds to a terminal identifier of a user terminal and that is in an online shopping application and a real-time product label attribute corresponding to the terminal identifier, the data recommendation device selects, according to the periodic product label attribute and the real-time product label attribute, at least one piece of recommendation product data in a product data set corresponding to the online shopping application, and the data recommendation device sends the at least one piece of recommendation product data to the user terminal. A process of generating recommendation service data in real time based on service attributes provided by an offline layer and a real-time layer is implemented, the update efficiency of the recommendation service data is improved, the effect of service data recommendation is improved, and work of service data selection of the offline layer and service data recommendation of the real-time layer is shared, thereby improving the work efficiency of the service data recommendation.

The data recommendation device involved in the embodiments of the present disclosure may be a background service device corresponding to a target service, and is configured to generate corresponding recommendation service data according to label attributes that are at different dimensions and that correspond to the terminal identifier of the user terminal, and push the recommendation service data to the user terminal. The user terminal may include a tablet computer, a smartphone, a palm computer, and a terminal device with a function of supporting a target service, such as a mobile Internet device (MID). The target service may be an application that provides a service requirement, for example, a music application, a movie application, or an online shopping application.

The traditional recommendation system architecture is generally composed of an offline layer and a real-time layer. The offline layer is mainly responsible for the generation of basic data. The real-time side is mainly responsible for generating recommended data and sending the data to the client. However, this processing method and architecture usually has the following disadvantages: The first is that the offline layer is vulnerable to the impact of the general conditions within the computation cluster. If there are too many tasks being performed in the cluster, it often leads to the failure of producing task output, which further results in the data not being updated, which will seriously affect the online user's data experience. The second is that, the real-time layer is constrained by the real-time conditions, and generally needs to process the business logic in a very short amount of turn-around time, and send the data to the client, so the real-time layer is not suitable to handle very complicated business logic. The third is the lack of real-time learning mechanism in the real-time layer. Currently, the real-time layer is takes the main responsibility for generating recommendation data. Even if a user feedback model is established in the real-time layer, since the real-time layer is only able to push out 3-5 data pieces per batch (e.g., within the required turn-around time), this data volume sample is too small and the training result is easily over-sensitive. Another reason is that even if the user's feedback can be used to train the recommendation model in real time on the real-time layer, the training result needs to be returned to the offline layer and change the operation of the offline layer, which means the operation will only take effect the next time that the offline layer is updated. While offline layers are typically on a daily or weekly basis to carry out periodic operation, so real-time feedback effect is often not ideal.

To solve the above problem, the present disclosure describes a solution that proposes a high-performance recommendation system architecture based on the beanstalkd distributed message queue implementation. The system adds an intermediate layer between the offline layer and the real-time layer, and the intermediate layer uses the beanstalkd message queue to implement the on-demand calculations. According to the principle of on-demand computation, the intermediate layer, as compared to the real-time layer, does not have a strict processing time limit as the real-time layer, so some of the offline layer's tasks can be moved to the middle layer to run, thereby reducing the computational burden of the offline layer, while the real-time layer also transfers the task to generate recommended data to the intermediate layer, leaving the real-time layer specifically designed to learn user behavior feedback.

The traditional recommendation system architecture can be divided into offline layer and real-time layer according to their functions. The offline layer is responsible for basic data operations, including user profile building, and similar data building tasks, etc. These data building tasks are computationally intensive and require a distributed computing platform. Real-time layer receives the user's requests in real time, and its task is mainly to reprocess the offline data to generate the final recommendation result and push it to the clients in real time. In order to prevent the delay from affecting the online service experience, generally, the logic of the real-time layer is relatively simple, and offline data is only simply processed.

Although the traditional two-tier recommendation architecture can meet the requirements of the basic recommendation system, there are many obvious deficiencies in the increasingly complex recommendation scenarios, and it is not conducive to expansion. Its main disadvantages include:

The first is that the offline layer bears most of the full amount of calculations. The real-time layer only performs simple reprocessing. Therefore, the recommended data quality depends largely on the effectiveness of off-line data. A large number of trivial tasks can easily cause offline task calculation delays or even task failures.

The second is that the offline layer does not interact well with the real-time layer. The real-time layer is mainly responsible for reprocessing the data and sending it to the client. However, in order to be able to timely capture the user's real-time behavior, the learning model needs to be perfected in the real-time layer to learn the user's real-time feedback. This is a difficult problem to solve in the traditional architecture, because even user behavior learning is implemented in the real-time layer, but being limited by the characteristics of the real-time layer, in order to ensure real-time response of the real-time layer, it is necessary to abandon some algorithm logic with high complexity. Therefore, if the system architecture is a traditional two-tier structure, both recommended data and a user behavior model must be built in the real-time layer, which makes it difficult to find a balance between calculation efficiency and operation and calculation complexity.

Finally, if the results of the user's real-time behavior are applied to the offline layer and then the results would need to wait until the next offline layer operation to take effect. Generally, this period is one day or even one week. Therefore, for a highly real-time recommended scenario, this method is obviously very unsatisfactory.

In view of the above drawbacks, the technical solution proposed in this disclosure is to use the beanstalkd message queue to build an intermediate layer between the offline layer and the real-time layer. On the one hand, the intermediate layer is responsible for some of the more trivial tasks in the offline layer to reduce the operation load of the offline layer. On the other hand, move the task for generating recommendation data from the real-time side into the intermediate layer, and let the real-time layer concentrate on learning the complex behaviors of users. The recommended data generated by each calculation in the intermediate layer is generally 15-20 pieces, instead of the traditional 3-5 pieces. The purpose of this is to make sure that enough sample data is generated each time, so that the user behavior of the user can be learned in real time. There will be a higher degree of confidence to avoid over-sensitivity caused by misuse. However, the sample size should not be too large. If the number of recommendations generated per batch is too large, it is very likely that before the adjustment is made, the user experience is not satisfactory and the gives up prematurely.

The architecture proposed in this solution is suitable for all service recommendation scenarios, such as app recommendation, movie recommendation, music recommendation, etc.

This solution proposes a novel high-performance and easily-expandable recommendation architecture design. It is a general architecture model. Different service scenarios may have subtle differences. For example, the "you may like . . . " type of recommendation on an internet radio site is a dynamic recommendation scenario. There will be higher requirements on the real-time aspect. Real-time feedback will directly affect the user's experience. On the other hand, the daily selection is a form of song list recommendation, and it will only occur once a day. The change is a static scene. Therefore, it has higher computational requirements for the offline layer.

Figure 3:
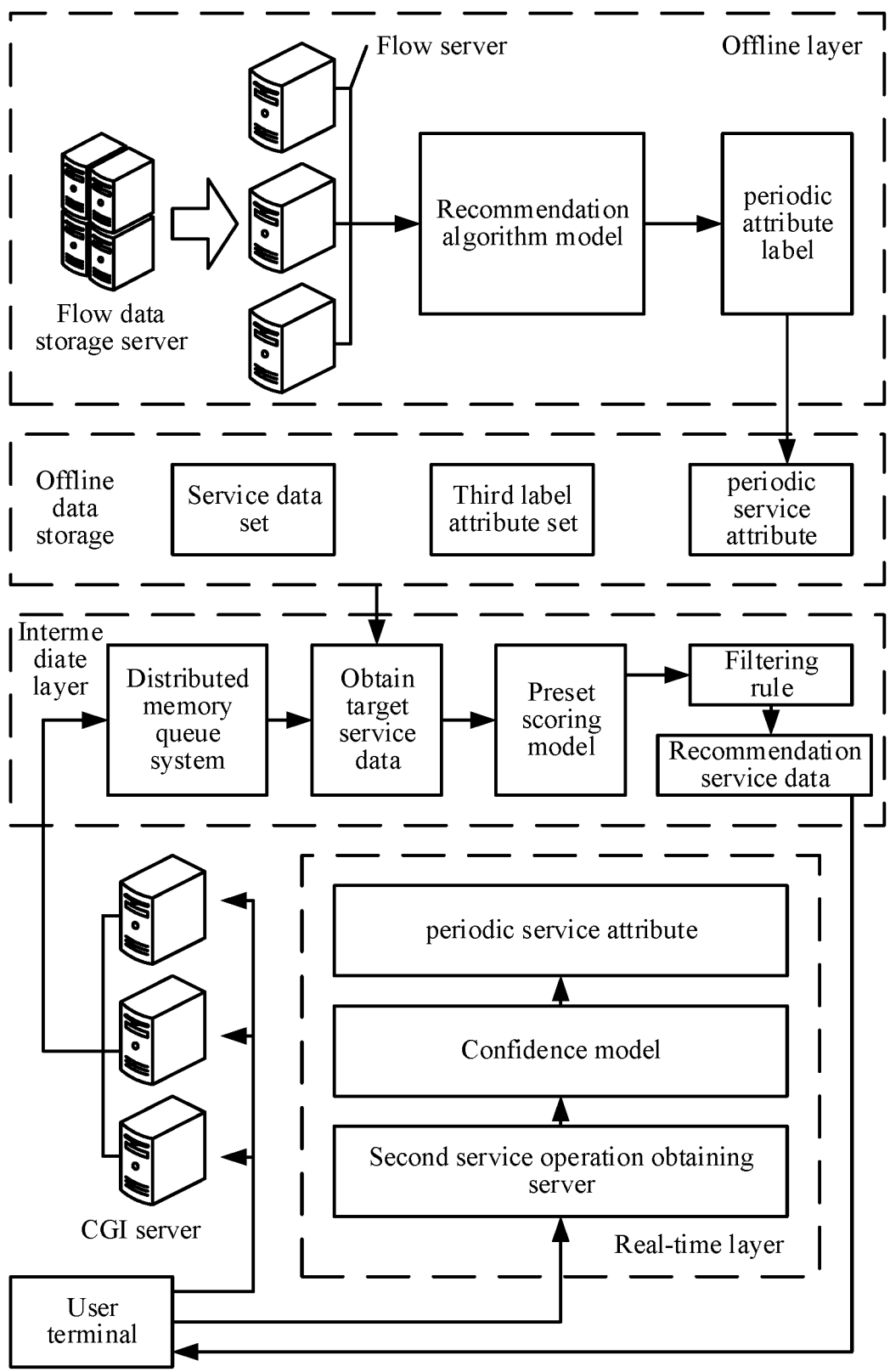
FIG. 3 is a schematic diagram of an example of a system of a data recommendation method according to an embodiment of the present disclosure.

The three-tier recommendation architecture based on beanstalkd message queue design is shown in FIG. 3, for example.

Offline layer: As shown in the top layer of the figure, it is mainly responsible for the construction and calculation of basic data. The basic data is divided into the following two parts:

The first is the basic data related to the content library (e.g., music library, image library, article library, etc.) and the user, including the construction of the user's profile and content labeling system (e.g., song labeling system, image labeling system, etc.). The user profile is a description of people's different dimensional attributes, such as on the music side, will include genre preferences, singer preferences, language and age preferences, etc. In social products, it will also include people's group attributes, regional attributes, interest attributes, etc. These attributes are a description of people. Through the user's profile we can observe the user's interests in different dimensions. The content label system (e.g., song's label system, image label system) is an important part of the library's construction. It includes the construction of content's (e.g., songs', images') moods and other labels. It can be said that the label system is the most important part of the whole basic data, and its data determines the quality of the upper-level data.

The second is the algorithm model, which is commonly used recommendation algorithm model, including the commonly used user-based and item-based collaborative filtering, also includes a content-based recommendation based on the label system and the user's profile, of course, we also make full use of the two machine learning platforms, spark and tensor flow, and gradually implement deep learning models including RBM and RNN. Compared with the previous models, they can mine deep user and song information. Such information is often helpful for users in discovering new songs.

The offline layer is characterized by a particularly large amount of computation. Even in a distributed computing platform, it usually requires more than 10 hours of training time. This part of the work obviously cannot be used as a real-time calculation. We will divide its operations into daily operations and weekly operations according to the characteristics of the data, and import the resulting data into appropriate storage platforms for data invocation by the intermediate layer.

The intermediate layer: The intermediate layer is based on the principle of on-demand computing. It is built through the beanstalkd message queue. Beanstalkd is a distributed memory queuing system. Compared with other queuing systems, it is simple, lightweight, high-performance, and easy to use. Features such as use, priority, multi-queue, persistence, distributed fault tolerance, and timeout control. The use of beanstalkd to deploy the intermediate tier has been proven to be superior than other implementations through experiment testing.

When the user sends a request to the CGI server through the client, the server sends a number request to the computing server in the intermediate layer. Each number is stored in the beanstalkd message queue. The computing server initiates 300 to 500 computing processes. Each process follows the FIFO (the first-come-first-served) principle, and takes the numbers from the beanstalkd message queue in order to perform calculations. In an example, a total of five computing servers are deployed in the music recommendation scenario, each with a total of 300 processes, making a total of 1,500 processes. For each process, the processing time is about 200 ms, so it can process about 7500 requests in one second, and each batch of generated songs is enough for users to consume in 4-5 batches, that is, every user has an average of 4-5 clicks to consume the recommended songs (e.g., receive the recommended songs for 4-5 clicks) and trigger the next batch of calculations. This way, this layer can respond to about 50,000 clicks per second in real time, and can handle tens of millions of user visits per day.

Each time the intermediate layer will generate 15-20 song data, that is, the user will consume 4-5 batches of song data before continuing to send calculation requests to the CGI side, so compared to the original two-tier structure (offline—real-time), In the intermediate layer, there is more time to calculate the data so that more complex calculation models or rules can be used in the calculations. The main tasks of this layer usually include candidate source selection and cleanup, song reordering, and some rules engines. The final result data will also be stored in the storage system. The CGI server will read the data from the storage system and push the data to the client terminals with the principle of 3-5 pieces of data per batch.

In addition, one of the characteristics of the intermediate tier is that it can interact with the real-time layer in real time, and the real-time layer updates the behavior model by the user's behavior of consuming songs generated last time, and adjusts the next generation result in real time according to the model. This is in contrast to the traditional two-tier structure (offline and real-time layer), where the real-time layer does model feedback to be applied to the offline layer and also wait for the next operation of the offline layer to take effect offline, and the offline layer usually takes one day or a week to run once, so the effect is not obvious.

Real-time layer: The main task of the real-time layer is divided into two parts: one task is to model the user's consumption of each batch of generated songs, so that we can use this result to guide the recommendation of the next batch of songs. The real-time layer has high performance requirement relative to time, therefore, online machine learning methods, such as LR SGD training, FTRL training model, etc. will be used in the real-time layer. Another major task of the real-time layer is the establishment of some rule engines, which can help to quickly determine some basic user feedback without the need for complex machine learning models, such as deletion or other very strong negative feedback operations. The characteristics of such operations is that the user's intentions are clear, so simple rules can often achieve good results in an online (real-time) environment.

Compared with the traditional recommendation architecture based on offline and real-time combination, the three-tier architecture based on beanstalkd message queue design makes the recommendation system more intelligent and more scalable. It is embodied in the following aspects:

The first is that the processing of each layer is independent and closely linked. The traditional two-tier architecture tends to work independently at each level and does not interact with each other, but a good system architecture can have effective feedback and complementary mechanisms. Based on the elegant realization of the three-tier architecture of beanstalkd, the intermediate layer can share part of the work of the offline layer, and the real-time layer can apply feedback to the middle tier in real time.

Secondly, the existence of the intermediate layer makes it possible to shift the mundane calculation work from the offline layer to the middle tier, which reduces the computational burden on the offline layer. For example, for some filtering operations, if it is the calculation of the full amount of users (as done in the offline layer), because it involves the join operations of different database tables, it can be very time consuming. But the intermediate layer is built to calculate on demand. Each process calculates for only one user at a time, and the code in the middle tier can be implemented in C++, so the calculation speed is very fast.

Third: The existence of the intermediate layer also makes it possible for the real-time layer's model feedback to be applied in real time to the next calculation for the same user. However, in the traditional two-layer structure, the real-time layer is mainly used as a tool for generating recommendation data. Even if a user feedback model is added in the real-time layer, the result must be applied to the offline layer and wait until the next time the offline layer updates to take effect. The process often takes a day or even a week.

The solution disclosed herein uses a message queue based on beanstalkd. Compared with other queue systems, its advantages have also been mentioned earlier, including high-performance, being distributed, lightweight, and has simple deployment. Other memory queuing systems, such as RabbitMQ, kafka, Memcacheq, Fqueue, etc. are also suitable for building high-performance three-tier architectures, but there may be some slight differences in ease of use and system deployment.

Figure 2:
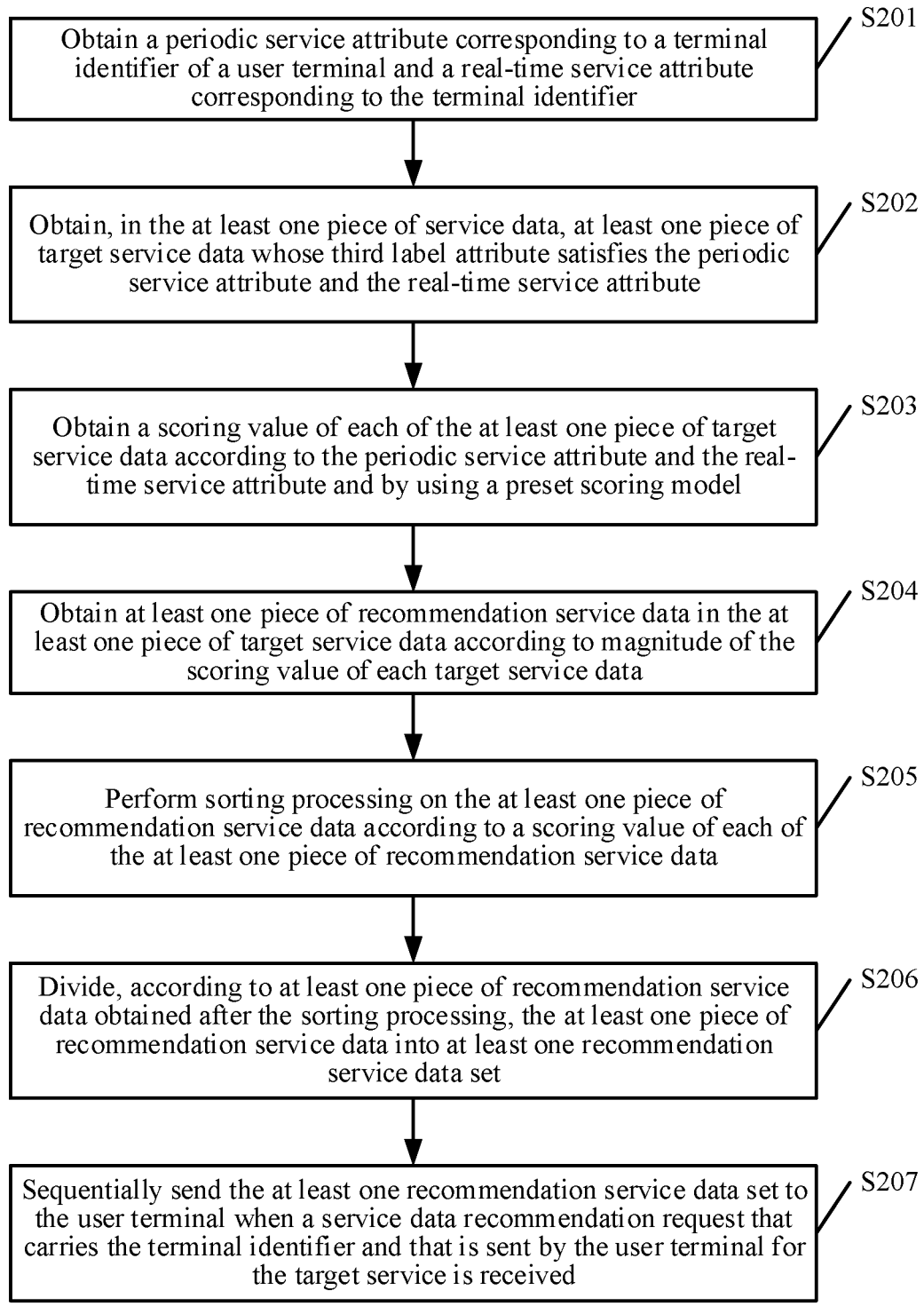
FIG. 2 is a schematic flowchart of another data recommendation method according to an embodiment of the present disclosure.

The following describes the data recommendation method according to the embodiments of the present disclosure in detail with reference to FIG. 1 and FIG. 2.

Referring to FIG. 1, FIG. 1 is a schematic flowchart of a data recommendation method according to an embodiment of the present disclosure. As shown in FIG. 1, the method of this embodiment of the present disclosure may include the following step S101 to step S103.

S101. Obtain a periodic service attribute corresponding to a terminal identifier of a user terminal and a real-time service attribute corresponding to the terminal identifier.

In another embodiment of the present disclosure, the data recommendation device may obtain a periodic service attribute that corresponds to a terminal identifier of a user terminal and that is targeted for a target service and a real-time service attribute corresponding to the terminal identifier. It should be noted that, the terminal identifier of the user terminal may be a unique identification number of the user terminal, or may be a unique service identifier for performing user registration on the target service, and for logging in the target service by using the user terminal, for example, an application account of a music application, or an application account of an online shopping application.

In this embodiment of the present disclosure, the periodic service attribute is a first label attribute that corresponds to the terminal identifier and that is obtained through calculation according to a first service operation that is targeted for the target service and that is uploaded under the terminal identifier in a first preset period of time. Further, the periodic service attribute may be a first label attribute that corresponds to the terminal identifier and that is obtained through calculation by using a preset recommendation algorithm model and based on the recorded first service operation that is targeted for the target service and that is uploaded under the terminal identifier in the first preset period of time. In another embodiment of the present disclosure, the first label attribute is obtained by an offline layer through calculation. For example, for a music application, the first service operation is operations that are uploaded under the terminal identifier in one month with respect to songs in the music application. The first service operation includes operations such as downloading, skipping, deleting, and collecting. The first service operations associated with the terminal identifier in one month are uploaded. The offline layer may calculate the first label attribute corresponding to the terminal identifier by using a preset recommendation algorithm model, for example, a User-Based and Item-Based collaborative filtering algorithm model, a Content-Based recommendation algorithm model, a Restricted Boltzmann Machine (RBM) model, or a Recurrent Neural Network (RNN) model, and according to the first operations under the terminal identifier The first label attribute includes comprehensive music genre, singer preference, time preference, and the like in one month. The offline layer may also calculate other similar music data of a music list under the terminal identifier.

The real-time service attribute is a second label attribute that corresponds to the terminal identifier and that is obtained through calculation according to a second service operation that is targeted for the target service and that is uploaded under the terminal identifier in real time. Further, the real-time service attribute may be a second label attribute that corresponds to the terminal identifier and that is obtained through calculation by using a preset confidence model and based on the recorded second service operation that is targeted for the target service and that is uploaded under the terminal identifier in a second preset period of time. The first preset period of time is greater than the second preset period of time (e.g., orders of magnitude greater, e.g., sub-second vs. days or weeks). In another embodiment of the present disclosure, the second label attribute is obtained by a real-time layer through calculation. For example, for a relatively static application scenario such as a daily selected song in a music application, a second service operation that is targeted for music data in the music application and that is uploaded under the terminal identifier in one day is obtained. The second service operation includes operations such as downloading, skipping, deleting, and collecting. The real-time layer may calculate a second label attribute corresponding to the terminal identifier by using a preset confidence model, for example, a Stochastic Gradient Descent (SGD) algorithm model or a Follow The Regularized Leader (FTRL) algorithm model, and according to the second service operation under the terminal identifier. The second label attribute includes comprehensive music genre, singer preference, time preference, and the like in one day.

In another embodiment of the present disclosure, the real-time service attribute may be the real-time service attribute that corresponds to the terminal identifier and that is obtained through calculation by using a preset confidence model and based on the recorded second service operation under the terminal identifier for historical recommendation service data. The historical recommendation service data is a previous batch of recommendation service data based on recommendation service data this time. For example, for a dynamic application scenario such as Guess You Like in a music application, 15 pieces of music data may be selected all at once as a batch of recommendation service data, and are pushed every five pieces at three times. Therefore, a second service operation uploaded for this batch of recommendation service data (that is, historical recommendation service data) under the terminal identifier may be obtained. The second service operation includes operations such as downloading, skipping, deleting, and collecting. The real-time layer may also calculate a second label attribute corresponding to the terminal identifier by using a preset confidence model, and according to the second service operation under the terminal identifier. The second label attribute includes music genre, singer preference, time preference and the like that are indicated by the second service operation for this batch of recommendation service data.

It should be noted that, the first service operation and the second service operation may be same service operations, and are distinguished by using first and second to only explain the difference of periodic and real-time.

S102. Select at least one piece of recommendation service data in a service data set corresponding to the target service according to the periodic service attribute and the real-time service attribute.

In another embodiment of the present disclosure, the data recommendation device may select at least one piece of recommendation service data in a service data set corresponding to the target service according to the periodic service attribute and the real-time service attribute. In another embodiment of the present disclosure, the service data set includes at least one piece of service data, and each of the at least one piece of service data has a third label attribute corresponding to each service data. For example, for a music application, each music data in a music library corresponds to a third label attribute such as music genre, singer, or year. The data recommendation device may obtain, in the at least one piece of service data, at least one piece of target service data whose third label attribute satisfies the periodic service attribute and the real-time service attribute. The data recommendation device may select, in the service data set, all service data whose third label attribute satisfies the periodic service attribute and the real-time service attribute. The at least one piece of target service data represents all service data selected in the service data set according to the periodic service attribute and the real-time service attribute. The data recommendation device obtains a scoring value of each of the at least one piece of target service data according to the periodic service attribute and the real-time service attribute and by using a preset scoring model. The preset scoring model may be a Gradient Boosting Decision Tree (GBDT) algorithm model. The data recommendation device obtains at least one piece of recommendation service data in the at least one piece of target service data according to magnitude of the scoring value of each target service data.

S103. Send the at least one piece of recommendation service data to the user terminal.

In another embodiment of the present disclosure, the data recommendation device may send the at least one piece of recommendation service data to the user terminal corresponding to the terminal identifier. In another embodiment of the present disclosure, for the foregoing relatively static application scenario, when receiving a service data recommendation request that carries the terminal identifier and that is sent by the user terminal, the data recommendation device may search for the at least one piece of recommendation service data corresponding to the terminal identifier, and send the at least one piece of recommendation service data to the user terminal. For the foregoing dynamic application scenario, the data recommendation device may perform sorting processing on the at least one piece of recommendation service data according to a scoring value of each of the at least one piece of recommendation service data, and divide, after the sorting processing, the at least one piece of recommendation service data into at least one recommendation service data set. Each of the at least one recommendation service data set includes a preset quantity of recommendation service data. For example, for a music application, a total of 15 pieces of music data are selected as a batch of recommendation service data, and are pushed every five pieces at three times. When receiving a service data recommendation request that carries the terminal identifier and that is sent by the user terminal for the target service, the data recommendation device may sequentially send the at least one recommendation service data set to the user terminal. In another embodiment of the present disclosure, each time a service data recommendation request is received, a recommendation service data set may be sent; or after a service data recommendation request is received, a recommendation service data set may be sent at an interval of time. It may be understood that, the recommendation service data set sent this time is different from the recommendation service data set sent historically. Certainly, the step of receiving a service data recommendation request may also be performed before the step of obtaining a periodic service attribute corresponding to a terminal identifier of a user terminal and a real-time service attribute corresponding to the terminal identifier, that is, a process of selecting recommendation service data is performed only when a service data recommendation request is received. The sequence of performing the receiving a service data recommendation request may be determined according to service requirements of different target services.

In this embodiment of the present disclosure, a periodic service attribute of an offline layer and a real-time service attribute of a real-time layer are obtained, and recommendation service data in a service data set is selected in real time, and pushed to a user terminal. A process of generating recommendation service data in real time based on service attributes provided by an offline layer and a real-time layer is implemented, the update efficiency of the recommendation service data is improved, the effect of service data recommendation is improved, and work of service data selection of the offline layer and service data recommendation of the real-time layer is shared, thereby improving the work efficiency of the service data recommendation.

Referring to FIG. 2, FIG. 2 is a schematic flowchart of another data recommendation method according to an embodiment of the present disclosure. As shown in FIG. 2, the method of this embodiment of the present disclosure may include the following step S201 to step S207.

S201. Obtain a periodic service attribute corresponding to a terminal identifier of a user terminal and a real-time service attribute corresponding to the terminal identifier.

In another embodiment of the present disclosure, the data recommendation device may obtain a periodic service attribute that corresponds to a terminal identifier of a user terminal and that is targeted for a target service and a real-time service attribute corresponding to the terminal identifier. It should be noted that, the terminal identifier of the user terminal may be a unique identification number of the user terminal, or may be a unique service identifier for performing user registration on the target service, and for logging in the target service by using the user terminal, for example, an application account of a music application, or an application account of an online shopping application.

In this embodiment of the present disclosure, the periodic service attribute is a first label attribute that corresponds to the terminal identifier and that is obtained through calculation according to a first service operation that is targeted for the target service and that is uploaded under the terminal identifier in a first preset period of time. Further, the periodic service attribute may be a first label attribute that corresponds to the terminal identifier and that is obtained through calculation by using a preset recommendation algorithm model and based on the recorded first service operation that is targeted for the target service and that is uploaded under the terminal identifier in the first preset period of time. In another embodiment of the present disclosure, the first label attribute is obtained by an offline layer through calculation. For example, for a music application, a first service operation that is targeted for a song in the music application and that is uploaded under the terminal identifier in one month is obtained. The first service operation includes operations such as downloading, skipping, deleting, and collecting. The offline layer may calculate the first label attribute corresponding to the terminal identifier by using a preset recommendation algorithm model, for example, a User-Based and Item-Based collaborative filtering algorithm model, a Content-Based recommendation algorithm model, an RBM model, or an RNN model, and according to a first operation under the terminal identifier. The first label attribute includes comprehensive music genre, singer preference, time preference, and the like in one month. The offline layer may also calculate other similar music data of a music list under the terminal identifier.

The real-time service attribute is a second label attribute that corresponds to the terminal identifier and that is obtained through calculation according to a second service operation that is targeted for the target service and that is uploaded under the terminal identifier in real time. Further, the real-time service attribute may be a second label attribute that corresponds to the terminal identifier and that is obtained through calculation by using a preset confidence model and based on the recorded second service operation that is targeted for the target service and that is uploaded under the terminal identifier in a second preset period of time. The first preset period of time is greater than the second preset period of time. In another embodiment of the present disclosure, the second label attribute is obtained by a real-time layer through calculation. For example, for a relatively static application scenario such as a daily selected song in a music application, a second service operation that is targeted for music data in the music application and that is uploaded under the terminal identifier in one day is obtained. The second service operation includes operations such as downloading, skipping, deleting, and collecting. The real-time layer may calculate a second label attribute corresponding to the terminal identifier by using a preset confidence model, for example, an SGD algorithm model or an FTRL algorithm model, and according to the second service operation under the terminal identifier. The second label attribute includes comprehensive music genre, singer preference, time preference, and the like in one day.

In another embodiment of the present disclosure, the real-time service attribute may be the real-time service attribute that corresponds to the terminal identifier and that is obtained through calculation by using a preset confidence model and based on the recorded second service operation under the terminal identifier for historical recommendation service data. The historical recommendation service data is a previous batch of recommendation service data based on recommendation service data this time. For example, for a dynamic application scenario such as Guess You Like in a music application, 15 pieces of music data may be selected all at once as a batch of recommendation service data, and are pushed every five pieces at three times. Therefore, a second service operation uploaded for this batch of recommendation service data (that is, historical recommendation service data) under the terminal identifier may be obtained. The second service operation includes operations such as downloading, skipping, deleting, and collecting. The real-time layer may also calculate a second label attribute corresponding to the terminal identifier by using a preset confidence model, and according to the second service operation under the terminal identifier. The second label attribute includes music genre, singer preference, time preference and the like that are indicated by the second service operation for the batch of recommendation service data.

It should be noted that, the first service operation and the second service operation may be same service operations, and are distinguished by using first and second to only explain the difference of periodic and real-time.

S202. Obtain, in the at least one piece of service data, at least one piece of target service data whose third label attribute satisfies the periodic service attribute and the real-time service attribute.

In another embodiment of the present disclosure, the service data set includes at least one piece of service data, and each of the at least one piece of service data has a third label attribute corresponding to each service data. For example, for a music application, each music data in a music library corresponds to a third label attribute such as music genre, singer, or year. The data recommendation device may obtain, in the at least one piece of service data, at least one piece of target service data whose third label attribute satisfies the periodic service attribute and the real-time service attribute. The data recommendation device may select, in the service data set, all service data whose third label attribute satisfies the periodic service attribute and the real-time service attribute. The at least one piece of target service data represents all service data selected in the service data set according to the periodic service attribute and the real-time service attribute.

In another embodiment of the present disclosure, the data recommendation device may obtain, in the at least one piece of service data, first candidate service data corresponding to a third label attribute matching the periodic service attribute. For example, for a music application, a third label attribute of A music data in a music data set may be XX genre, YY singer, and ZZ year, a third label attribute of B music data may be OO genre, PP singer, and QQ year, a third label attribute of C music data may be DD genre, EE singer, and FF year, the periodic service attribute is XX genre and QQ year, and the data recommendation device may use A music data and B music data as first candidate service data. The data recommendation device obtains, in the at least one piece of service data, second candidate service data corresponding to a third label attribute matching the real-time service attribute. According to the foregoing example, if the real-time layer detects that the second service operation executed by the terminal identifier includes continuously collecting music data of EE singer, the data recommendation device may use C music data as second candidate service data. The data recommendation device determines the first candidate service data and the second candidate service data as at least one piece of target service data.

In another embodiment of the present disclosure, the data recommendation device may further obtain, in the at least one piece of service data, third candidate service data corresponding to a third label attribute matching the periodic service attribute. For example, for a music application, a third label attribute of A music data in a music data set may be XX genre, YY singer, and ZZ year, a third label attribute of B music data may be OO genre, PP singer, PP singer, and QQ year, a third label attribute of C music data may be DD genre, EE singer, and FF year, the periodic service attribute is XX genre and QQ year, and the data recommendation device may use A music data, B music data, and C music data as third candidate service data. The data recommendation device deletes, from the third candidate service data, fourth candidate service data corresponding to a third label attribute matching the real-time service attribute. According to the foregoing example, if the real-time layer detects that the second service operation executed by the terminal identifier includes continuously deleting music data of PP singer, the data recommendation device may use B music data as fourth candidate service data, and the data recommendation device generates at least one piece of target service data according to the third candidate service data from which the fourth candidate service data is deleted.

S203. Obtain a scoring value of each of the at least one piece of target service data according to the periodic service attribute and the real-time service attribute and by using a preset scoring model.

In another embodiment of the present disclosure, the data recommendation device obtains a scoring value of each of the at least one piece of target service data according to the periodic service attribute and the real-time service attribute and by using a preset scoring model. The preset scoring model may be a GBDT algorithm model. Further, the data recommendation device may use the periodic service attribute and the real-time service attribute as weighting parameters of the preset scoring model, and calculate a scoring value of each of the at least one piece of target service data.

S204. Obtain at least one piece of recommendation service data in the at least one piece of target service data according to magnitude of the scoring value of each target service data.

In another embodiment of the present disclosure, the data recommendation device obtains at least one piece of recommendation service data in the at least one piece of target service data according to magnitude of the scoring value of each target service data. In another embodiment of the present disclosure, the data recommendation device may sort the at least one piece of target service data according to magnitude of the scoring value of each target service data, and select, in the sorted at least one piece of target service data, a preset quantity of target service data with the highest scoring value as at least one piece of recommendation service data.

Further, the data recommendation device may further filter the selected preset quantity of target service data with the highest scoring value based on a preset filtering rule, to obtain the at least one piece of recommendation service data. The filtering rule may be a filtering rule set by a developer based on a service feature of the target service. For example, for a music application, the filtering rule may stipulate that a label attribute of a same singer cannot exist in the selected preset quantity of music data with the highest scoring value.

In this embodiment of the present disclosure, the data recommendation device may send the at least one piece of recommendation service data to the user terminal corresponding to the terminal identifier. In another embodiment of the present disclosure, for the foregoing relatively static application scenario, when receiving a service data recommendation request that carries the terminal identifier and that is sent by the user terminal, the data recommendation device may search for the at least one piece of recommendation service data corresponding to the terminal identifier, and send the at least one piece of recommendation service data to the user terminal. For the foregoing dynamic application scenario, reference may be made to the following steps S205 to S207 of the embodiments of the present disclosure.

S205. Perform sorting processing on the at least one piece of recommendation service data according to a scoring value of each of the at least one piece of recommendation service data.

S206. Divide, according to at least one piece of recommendation service data obtained after the sorting processing, the at least one piece of recommendation service data into at least one recommendation service data set.

S207. Sequentially send the at least one recommendation service data set to the user terminal when a service data recommendation request that carries the terminal identifier and that is sent by the user terminal for the target service is received.

In another embodiment of the present disclosure, the data recommendation device may perform sorting processing on the at least one piece of recommendation service data according to a scoring value of each of the at least one piece of recommendation service data, and divide, after the sorting processing, the at least one piece of recommendation service data into at least one recommendation service data set. Each of the at least one recommendation service data set includes a preset quantity of recommendation service data. For example, for a music application, a total of 15 pieces of music data are selected as a batch of recommendation service data, and are pushed every five pieces at three times. When receiving a service data recommendation request that carries the terminal identifier and that is sent by the user terminal for the target service, the data recommendation device may sequentially send the at least one recommendation service data set to the user terminal. In another embodiment of the present disclosure, each time a service data recommendation request is received, a recommendation service data set may be sent; or after a service data recommendation request is received, a recommendation service data set may be sent at an interval of time. It may be understood that, the recommendation service data set sent this time is different from the recommendation service data set sent historically. Certainly, the step of receiving a service data recommendation request may also be performed before the step of obtaining a periodic service attribute corresponding to a terminal identifier of a user terminal and a real-time service attribute corresponding to the terminal identifier, that is, a process of selecting recommendation service data is performed only when a service data recommendation request is received. The sequence of performing the receiving a service data recommendation request may be determined according to service requirements of different target services.

In another embodiment of the present disclosure, the data recommendation device may add the service data recommendation request to a request queue constructed by using a distributed memory queue system for processing. It may be understood that, the request queue constructed by using the distributed memory queue system has features such as lightweight, high-performance, easy to use, multi-queue, persistence, distributed fault tolerance, and time-out control. Certainly, a request queue may also be constructed by using another memory queue system, such as RabbitMQ, Kafka, Memcacheq, or Fqueue.

In this embodiment of the present disclosure, a periodic service attribute of an offline layer and a real-time service attribute of a real-time layer are obtained, and recommendation service data in a service data set is selected in real time, and pushed to a user terminal. A process of generating recommendation service data in real time based on service attributes provided by an offline layer and a real-time layer is implemented, the update efficiency of the recommendation service data is improved, the effect of service data recommendation is improved, and work of service data selection of the offline layer and service data recommendation of the real-time layer is shared, thereby improving the work efficiency of the service data recommendation. The recommendation service data is selected based on the periodic service attribute and the real-time service attribute, different static and dynamic application scenarios are satisfied, and user experience is improved. A request queue is constructed by using a distributed memory queue system, so that the request queue may have features such as lightweight, high-performance, easy to use, multi-queue, persistence, distributed fault tolerance, and time-out control.

Referring to FIG. 3, FIG. 3 is a schematic diagram of an example of a system of a data recommendation method according to an embodiment of the present disclosure. As shown in FIG. 3, a system for performing a data recommendation method may include an offline layer, an offline data storage, an intermediate layer, and a real-time layer. It may be understood that, the offline layer, the offline data storage, the intermediate layer, and the real-time layer may be deployed in different data blocks of a same server, or may be deployed in different servers. The intermediate layer is configured to perform the method steps performed by the foregoing data recommendation device.

For the offline layer, a flow data storage server is configured to store first service operations executed for target services under terminal identifiers in a preset period of time, and separately output the first service operations to a flow server for processing, to obtain operation information corresponding to the first service operations, for example, generate a corresponding array matrix as input data of a recommendation algorithm model. The recommendation algorithm model may include a User-Based and Item-Based collaborative filtering algorithm model, a Content-Based recommendation algorithm model, an RBM model, an RNN model, or the like. The recommendation algorithm model outputs a corresponding periodic attribute label. It may be understood that, each terminal identifier has a respective periodic attribute label, and the offline layer may store the periodic attribute label in the offline data storage. The offline layer may further calculate other similar service data of the existing service data under the terminal identifier, or the like, and the offline layer may also store similar service data of each terminal identifier in the offline data storage.

For the offline data storage, a service data set corresponding to the target service may be stored. The service data set may include at least one piece of service data, and each of the at least one piece of service data has a third label attribute corresponding to each service data. Therefore, the offline data storage further stores a third label attribute set, and the offline data storage further stores a respective periodic attribute label of each terminal identifier and similar service data.

For the intermediate layer, a user terminal may send a service data recommendation request that carries a terminal identifier of the user terminal to a common gateway interface (CGI). The CGI may transmit the service data recommendation request to a distributed memory queue system. The intermediate layer may pull, from the offline data storage, a service data set, a third label attribute set, and a periodic service attribute corresponding to the terminal identifier. The intermediate layer may pull a real-time service attribute of the terminal identifier from the real-time layer. The intermediate layer may select recommendation service data from a service data set corresponding to the target service according to the periodic service attribute and the real-time service attribute, the third label attribute set, and similar service data of the terminal identifier, and by using a preset scoring model. The preset scoring model may be a GBDT algorithm model. In another embodiment of the present disclosure, the intermediate layer may further filter a selected preset quantity of target service data with the highest scoring value based on a preset filtering rule, to obtain the recommendation service data. The filtering rule may be a filtering rule set by a developer based on a service feature of the target service. The intermediate layer sends the recommendation service data to the user terminal.

For the real-time layer, the real-time layer may obtain a second service operation corresponding to the terminal identifier of the user terminal in real time, transmit the second service operation to a second service operation obtaining server, and obtain a real-time service attribute corresponding to each terminal identifier through calculation by using a confidence model. The confidence model may include an SGD algorithm model, an FTRL algorithm model, or the like.

Based on the above, in some embodiments, a content recommendation method is performed at a plurality of servers for a content provider (e.g., a music service provider), each server including processors and memory, the plurality of servers organized into three architectural layers that operate on three distinct time scales, including an offline layer, an intermediate layer, and a real-time layer. The servers (e.g., in the intermediate layer) obtain a periodic service attribute corresponding to a terminal identifier of a user terminal and a real-time service attribute corresponding to the terminal identifier. The periodic service attribute is a first label attribute relevant for content recommendation that corresponds to the terminal identifier and that is obtained through calculation according to a first type of service operations for content of the content provider that have been performed under the terminal identifier in a first preset period of time corresponding to an update cycle of the offline layer. The real-time service attribute is a second label attribute relevant for content recommendation that corresponds to the terminal identifier and that is obtained through calculation according to a second type of service operations that for content of the content provider that have been performed under the terminal identifier in real time corresponding to a response time requirement of the real-time layer. The servers (e.g., in the intermediate layer) select at least one piece of recommended content in a content data set of the content provider according to the periodic service attribute and the real-time service attribute, wherein selection is performed in the intermediate layer with a time scale between the update cycle of the offline layer and the response time requirement of the real-time layer, and corresponding selection processes are performed on an on-demand basis for a plurality of terminal identifiers corresponding to user terminals that are currently actively engaged in interaction with the real-time layer. The servers send (e.g., the real-time layer) the at least one piece of recommended content to the user terminal as recommended content to the user of the user terminal.

In some embodiments, the obtaining the periodic service attribute corresponding to the terminal identifier of the user terminal and the real-time service attribute corresponding to the terminal identifier includes: obtaining the periodic service attribute relevant for content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and obtaining the real-time service attribute relevant for content recommendation that corresponds to the terminal identifier and that is obtained through calculation by using a preset confidence model and based on the recorded second type of service operations for content of the content provider that have been performed under the terminal identifier in a second preset period of time corresponding to the response time requirement of the real-time layer, wherein the first preset period of time is orders of magnitude greater than the second preset period of time.

In some embodiments, the obtaining the periodic service attribute corresponding to the terminal identifier of the user terminal and the real-time service attribute corresponding to the terminal identifier includes: obtaining the periodic service attribute relevant to content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and obtaining the real-time service attribute relevant to content recommendation that corresponds to the terminal identifier and that is obtained through calculation by using a preset confidence model and based on the recorded second type of service operations under the terminal identifier for historical recommendation service data.

In some embodiments, the content data set of the content provider comprises multiple pieces of content data, and each of the multiple pieces of content data has a corresponding third label attribute relevant to content recommendation; and the selecting at least one piece of recommended content in a content data set of the content provider according to the periodic service attribute and the real-time service attribute includes: obtaining, in the multiple pieces of content data, at least one piece of content data whose third label attribute satisfies the periodic service attribute and the real-time service attribute; obtaining a scoring value of each of the multiple pieces of content data according to the periodic service attribute and the real-time service attribute and by using a preset scoring model; and obtaining at least one piece of recommended content data in the multiple pieces of content data according to magnitude of the scoring value of each piece of content data in the content data set.

In some embodiments, the obtaining, in the multiple pieces of content data, at least one piece of recommended content data whose third label attribute satisfies the periodic service attribute and the real-time service attribute includes: obtaining, in the multiple pieces of content data, first candidate recommended content data corresponding to a respective third label attribute matching the periodic service attribute; obtaining, in the multiple pieces of content data, second candidate recommended content data corresponding to a respective third label attribute matching the real-time service attribute; and determining the first candidate recommended content data and the second candidate recommended content data as the at least one piece of recommended content data.

In some embodiments, the obtaining, in the multiple pieces of content data, at least one piece of recommended content data whose third label attribute satisfies the periodic service attribute and the real-time service attribute includes: obtaining, in the multiple pieces of content data, third candidate recommended content data corresponding to a respective third label attribute matching the periodic service attribute; deleting, from the third candidate recommended content data, fourth candidate recommended content data corresponding to a respective third label attribute matching the real-time service attribute; and generating the at least one piece of recommended content data according to the third candidate recommended content data from which the fourth candidate recommended content data is deleted.

In some embodiments, the sending the at least one piece of recommended content to the user of the user terminal includes: performing sorting processing on the at least one piece of recommended content data according to a scoring value of each of the recommended content data; dividing, the at least one piece of recommended content data into multiple sets of recommended content data, each of the multiple sets of recommended content data comprising a preset quantity of recommended content data; and sequentially sending the multiple sets of recommended content data in distinct batches to the user terminal, wherein each batch is sent to the user terminal when a service data recommendation request that carries the terminal identifier and that is sent by the user terminal for the content server is received.

Other aspects of the method are described with respect to other embodiments set forth herein, and are not repeated here in the interest of brevity.

Figure 4:
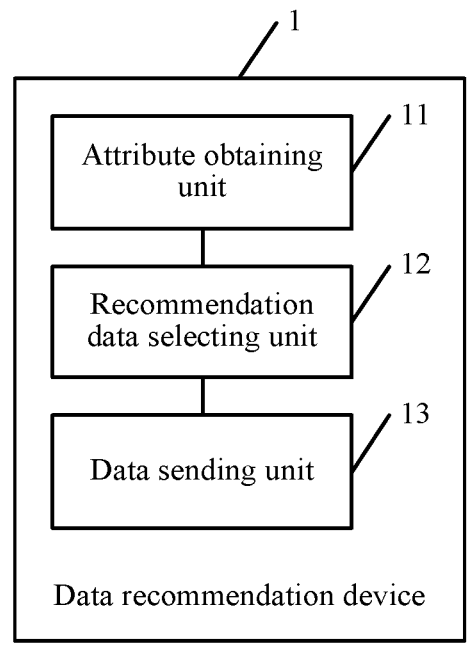
FIG. 4 is a schematic structural diagram of a data recommendation device according to an embodiment of the present disclosure.
Figure 5:
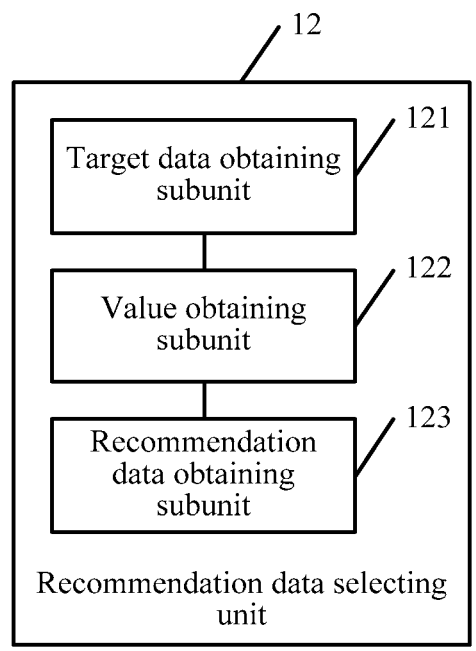
FIG. 5 is a schematic structural diagram of a recommendation data selecting unit according to an embodiment of the present disclosure.
Figure 6:
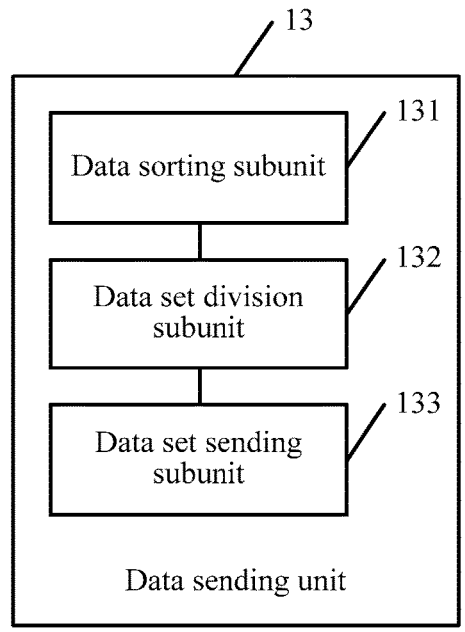
FIG. 6 is a schematic structural diagram of a data sending unit according to an embodiment of the present disclosure.

The following describes the data recommendation device provided in the embodiments of the present disclosure in detail with reference to FIG. 4 to FIG. 6. It should be noted that, the data recommendation device shown in FIG. 4 to FIG. 6 is configured to perform the methods in the embodiments shown in FIG. 1 to FIG. 3 of the present disclosure. For ease of description, only a part related to the embodiments of the present disclosure is shown. For technical details that are not disclosed, refer to the embodiments shown in FIG. 1 to FIG. 3 of the present disclosure.

Referring to FIG. 4, FIG. 4 is a schematic structural diagram of a data recommendation device according to an embodiment of the present disclosure. As shown in FIG. 4, the data recommendation device 1 of this embodiment of the present disclosure may include: an attribute obtaining unit 11, a recommendation data selecting unit 12, and a data sending unit 13.

The attribute obtaining unit 11 is configured to obtain a periodic service attribute corresponding to a terminal identifier of a user terminal and a real-time service attribute corresponding to the terminal identifier.

During implementation, the attribute obtaining unit 11 may obtain a periodic service attribute that corresponds to a terminal identifier of a user terminal and that is targeted for a target service and a real-time service attribute corresponding to the terminal identifier. It should be noted that, the terminal identifier of the user terminal may be a unique identification number of the user terminal, or may be a unique service identifier for performing user registration on the target service, and for logging in the target service by using the user terminal, for example, an application account of a music application, or an application account of an online shopping application.

In this embodiment of the present disclosure, the periodic service attribute is a first label attribute that corresponds to the terminal identifier and that is obtained through calculation according to a first service operation that is targeted for the target service and that is uploaded under the terminal identifier in a first preset period of time. Further, the periodic service attribute may be a first label attribute that corresponds to the terminal identifier and that is obtained through calculation by using a preset recommendation algorithm model and based on the recorded first service operation that is targeted for the target service and that is uploaded under the terminal identifier in the first preset period of time. In another embodiment of the present disclosure, the first label attribute is obtained by an offline layer through calculation. For example, for a music application, a first service operation that is targeted for a song in the music application and that is uploaded under the terminal identifier in one month is obtained. The first service operation includes operations such as downloading, skipping, deleting, and collecting. The offline layer may calculate the first label attribute corresponding to the terminal identifier by using a preset recommendation algorithm model, for example, a User-Based and Item-Based collaborative filtering algorithm model, a Content-Based recommendation algorithm model, an RBM model, or an RNN model, and according to a first operation under the terminal identifier. The first label attribute includes comprehensive music genre, singer preference, time preference, and the like in one month. The offline layer may also calculate other similar music data of a music list under the terminal identifier.

The real-time service attribute is a second label attribute that corresponds to the terminal identifier and that is obtained through calculation according to a second service operation that is targeted for the target service and that is uploaded under the terminal identifier in real time. Further, the real-time service attribute may be a second label attribute that corresponds to the terminal identifier and that is obtained through calculation by using a preset confidence model and based on the recorded second service operation that is targeted for the target service and that is uploaded under the terminal identifier in a second preset period of time. The first preset period of time is greater than the second preset period of time. In another embodiment of the present disclosure, the second label attribute is obtained by a real-time layer through calculation. For example, for a relatively static application scenario such as a daily selected song in a music application, a second service operation that is targeted for music data in the music application and that is uploaded under the terminal identifier in one day is obtained. The second service operation includes operations such as downloading, skipping, deleting, and collecting. The real-time layer may calculate a second label attribute corresponding to the terminal identifier by using a preset confidence model, for example, an SGD algorithm model or an FTRL algorithm model, and according to the second service operation under the terminal identifier. The second label attribute includes comprehensive music genre, singer preference, time preference, and the like in one day.

In another embodiment of the present disclosure, the real-time service attribute may be the real-time service attribute that corresponds to the terminal identifier and that is obtained through calculation by using a preset confidence model and based on the recorded second service operation under the terminal identifier for historical recommendation service data. The historical recommendation service data is a previous batch of recommendation service data based on recommendation service data this time. For example, for a dynamic application scenario such as Guess You Like in a music application, 15 pieces of music data may be selected all at once as a batch of recommendation service data, and are pushed every five pieces at three times. Therefore, a second service operation uploaded for this batch of recommendation service data (that is, historical recommendation service data) under the terminal identifier may be obtained. The second service operation includes operations such as downloading, skipping, deleting, and collecting. The real-time layer may also calculate a second label attribute corresponding to the terminal identifier by using a preset confidence model, and according to the second service operation under the terminal identifier. The second label attribute includes music genre, singer preference, time preference and the like that are indicated by the second service operation for this batch of recommendation service data.

It should be noted that, the first service operation and the second service operation may be same service operations, and are distinguished by using first and second to only explain the difference of periodic and real-time.

The recommendation data selecting unit 12 is configured to select at least one piece of recommendation service data in a service data set corresponding to the target service according to the periodic service attribute and the real-time service attribute.

During implementation, the recommendation data selecting unit 12 may select at least one piece of recommendation service data in a service data set corresponding to the target service according to the periodic service attribute and the real-time service attribute. In another embodiment of the present disclosure, the service data set includes at least one piece of service data, and each of the at least one piece of service data has a third label attribute corresponding to each service data. For example, for a music application, each music data in a music library corresponds to a third label attribute such as music genre, singer, or year. The recommendation data selecting unit 12 may obtain, in the at least one piece of service data, at least one piece of target service data whose third label attribute satisfies the periodic service attribute and the real-time service attribute. The recommendation data selecting unit 12 may select, in the service data set, all service data whose third label attribute satisfies the periodic service attribute and the real-time service attribute. The at least one piece of target service data represents all service data selected in the service data set according to the periodic service attribute and the real-time service attribute. The recommendation data selecting unit 12 obtains a scoring value of each of the at least one piece of target service data according to the periodic service attribute and the real-time service attribute and by using a preset scoring model. The preset scoring model may be a GBDT algorithm model. The recommendation data selecting unit 12 obtains at least one piece of recommendation service data in the at least one piece of target service data according to magnitude of the scoring value of each target service data.

In another embodiment of the present disclosure, also referring to FIG. 5, FIG. 5 is a schematic structural diagram of a recommendation data selecting unit according to an embodiment of the present disclosure. As shown in FIG. 5, the recommendation data selecting unit 12 may include: a target data obtaining subunit 121, a value obtaining subunit 122, and a recommendation data obtaining subunit 123.

The target data obtaining subunit 121 is configured to obtain, in the at least one piece of service data, at least one piece of target service data whose third label attribute satisfies the periodic service attribute and the real-time service attribute.

During implementation, the service data set includes at least one piece of service data, and each of the at least one piece of service data has a third label attribute corresponding to each service data. For example, for a music application, each music data in a music library corresponds to a third label attribute such as music genre, singer, or year. The target data obtaining subunit 121 may obtain, in the at least one piece of service data, at least one piece of target service data whose third label attribute satisfies the periodic service attribute and the real-time service attribute. The target data obtaining subunit 121 may select, in the service data set, all service data whose third label attribute satisfies the periodic service attribute and the real-time service attribute. The at least one piece of target service data represents all service data selected in the service data set according to the periodic service attribute and the real-time service attribute.

In another embodiment of the present disclosure, the target data obtaining subunit 121 may obtain, in the at least one piece of service data, first candidate service data corresponding to a third label attribute matching the periodic service attribute. For example, for a music application, a third label attribute of A music data in a music data set may be XX genre, YY singer, and ZZ year, a third label attribute of B music data may be OO genre, PP singer, and QQ year, a third label attribute of C music data may be DD genre, EE singer, and FF year, the periodic service attribute is XX genre and QQ year, and the target data obtaining subunit 121 may use A music data and B music data as first candidate service data. The target data obtaining subunit 121 obtains, in the at least one piece of service data, second candidate service data corresponding to a third label attribute matching the real-time service attribute. According to the foregoing example, if the real-time layer detects that the second service operation executed by the terminal identifier includes continuously collecting music data of EE singer, the target data obtaining subunit 121 may use C music data as second candidate service data. The target data obtaining subunit 121 determines the first candidate service data and the second candidate service data as at least one piece of target service data.

In another embodiment of the present disclosure, the target data obtaining subunit 121 may further obtain, in the at least one piece of service data, third candidate service data corresponding to a third label attribute matching the periodic service attribute. For example, for a music application, a third label attribute of A music data in a music data set may be XX genre, YY singer, and ZZ year, a third label attribute of B music data may be OO genre, PP singer, PP singer, and QQ year, a third label attribute of C music data may be DD genre, EE singer, and FF year, the periodic service attribute is XX genre and QQ year, and the target data obtaining subunit 121 may use A music data, B music data, and C music data as third candidate service data. The target data obtaining subunit 121 deletes, from the third candidate service data, fourth candidate service data corresponding to a third label attribute matching the real-time service attribute. According to the foregoing example, if the real-time layer detects that the second service operation executed by the terminal identifier includes continuously deleting music data of PP singer, the target data obtaining subunit 121 may use B music data as fourth candidate service data, and the target data obtaining subunit 121 generates at least one piece of target service data according to the third candidate service data from which the fourth candidate service data is deleted.

The value obtaining subunit 122 is configured to obtain a scoring value of each of the at least one piece of target service data according to the periodic service attribute and the real-time service attribute and by using a preset scoring model.

During implementation, the value obtaining subunit 122 obtains a scoring value of each of the at least one piece of target service data according to the periodic service attribute and the real-time service attribute and by using a preset scoring model. The preset scoring model may be a GBDT algorithm model. Further, the value obtaining subunit 122 may use the periodic service attribute and the real-time service attribute as weighting parameters of the preset scoring model, and calculate a scoring value of each of the at least one piece of target service data.

The recommendation data obtaining subunit 123 is configured to obtain at least one piece of recommendation service data in the at least one piece of target service data according to magnitude of the scoring value of each target service data.

During implementation, the recommendation data obtaining subunit 123 obtains at least one piece of recommendation service data in the at least one piece of target service data according to magnitude of the scoring value of each target service data. In another embodiment of the present disclosure, the recommendation data obtaining subunit 123 may sort the at least one piece of target service data according to magnitude of the scoring value of each target service data, and select, in the sorted at least one piece of target service data, a preset quantity of target service data with the highest scoring value as at least one piece of recommendation service data.

Further, the recommendation data obtaining subunit 123 may further filter the selected preset quantity of target service data with the highest scoring value based on a preset filtering rule, to obtain the at least one piece of recommendation service data. The filtering rule may be a filtering rule set by a developer based on a service feature of the target service. For example, for a music application, the filtering rule may stipulate that a label attribute of a same singer cannot exist in the selected preset quantity of music data with the highest scoring value.

The data sending unit 13 is configured to send the at least one piece of recommendation service data to the user terminal.

During implementation, the data sending unit 13 may send the at least one piece of recommendation service data to the user terminal corresponding to the terminal identifier. In another embodiment of the present disclosure, for the foregoing relatively static application scenario, when receiving a service data recommendation request that carries the terminal identifier and that is sent by the user terminal, the data sending unit 13 may search for the at least one piece of recommendation service data corresponding to the terminal identifier, and send the at least one piece of recommendation service data to the user terminal.

For the foregoing dynamic application scenario, also referring to FIG. 6, FIG. 6 is a schematic structural diagram of a data sending unit according to an embodiment of the present disclosure. As shown in FIG. 6, the data sending unit 13 may include:

a data sorting subunit 131, configured to perform sorting processing on the at least one piece of recommendation service data according to a scoring value of each of the at least one piece of recommendation service data;

a data set division subunit 132, configured to divide, according to at least one piece of recommendation service data obtained after the sorting processing, the at least one piece of recommendation service data into at least one recommendation service data set; and a data set sending subunit 133, configured to sequentially send the at least one recommendation service data set to the user terminal when a service data recommendation request that carries the terminal identifier and that is sent by the user terminal for the target service is received.

During implementation, the data sorting subunit 131 may perform sorting processing on the at least one piece of recommendation service data according to a scoring value of each of the at least one piece of recommendation service data, and the data set division subunit 132 divides, after the sorting processing, the at least one piece of recommendation service data into at least one recommendation service data set. Each of the at least one recommendation service data set includes a preset quantity of recommendation service data. For example, for a music application, a total of 15 pieces of music data are selected as a batch of recommendation service data, and are pushed every five pieces at three times. When receiving a service data recommendation request that carries the terminal identifier and that is sent by the user terminal for the target service, the data set sending subunit 133 may sequentially send the at least one recommendation service data set to the user terminal. In another embodiment of the present disclosure, each time a service data recommendation request is received, a recommendation service data set may be sent; or after a service data recommendation request is received, a recommendation service data set may be sent at an interval of time. It may be understood that, the recommendation service data set sent this time is different from the recommendation service data set sent historically. Certainly, the step of receiving a service data recommendation request may also be performed before the step of obtaining a periodic service attribute corresponding to a terminal identifier of a user terminal and a real-time service attribute corresponding to the terminal identifier, that is, a process of selecting recommendation service data is performed only when a service data recommendation request is received. The sequence of performing the receiving a service data recommendation request may be determined according to service requirements of different target services.

In another embodiment of the present disclosure, the data recommendation device 1 may add the service data recommendation request to a request queue constructed by using a distributed memory queue system for processing. It may be understood that, the request queue constructed by using the distributed memory queue system has features such as lightweight, high-performance, easy to use, multi-queue, persistence, distributed fault tolerance, and time-out control. Certainly, a request queue may also be constructed by using another memory queue system, such as RabbitMQ, Kafka, Memcacheq, or Fqueue.

In this embodiment of the present disclosure, a periodic service attribute of an offline layer and a real-time service attribute of a real-time layer are obtained, and recommendation service data in a service data set is selected in real time, and pushed to a user terminal. A process of generating recommendation service data in real time based on service attributes provided by an offline layer and a real-time layer is implemented, the update efficiency of the recommendation service data is improved, the effect of service data recommendation is improved, and work of service data selection of the offline layer and service data recommendation of the real-time layer is shared, thereby improving the work efficiency of the service data recommendation. The recommendation service data is selected based on the periodic service attribute and the real-time service attribute, different static and dynamic application scenarios are satisfied, and user experience is improved. A request queue is constructed by using a distributed memory queue system, so that the request queue may have features such as lightweight, high-performance, easy to use, multi-queue, persistence, distributed fault tolerance, and time-out control.

The units included in the data recommendation device in this embodiment of the present disclosure, and the subunits included in the units may be implemented by using a processor in the data recommendation device. Certainly, the functions implemented by the processor may also be implemented by using a logical circuit. In an implementation process, the processor may be a central processing unit (CPU), a micro processing unit (MPU), a digital signal processor (DSP), or a field programmable gate array (FPGA).

Figure 7:
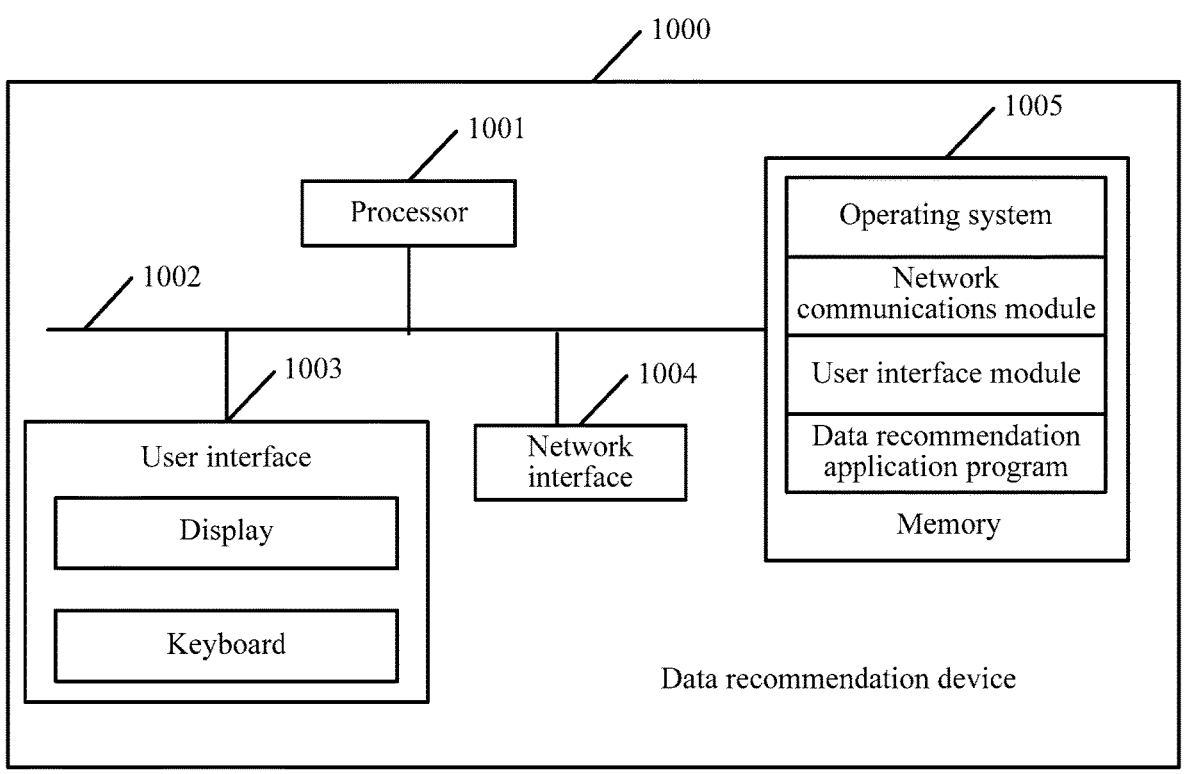
FIG. 7 is a schematic structural diagram of another data recommendation device according to an embodiment of the present disclosure.

Referring to FIG. 7, FIG. 7 is a schematic structural diagram of another data recommendation device according to an embodiment of the present disclosure. As shown in FIG. 7, the data recommendation device 1000 may include at least one processor 1001 such as a CPU, at least one network interface 1004, a user interface 1003, a memory 1005, and at least one communications bus 1002. The communications bus 1002 is configured to implement connection and communication between the components. The user interface 1003 may include a display and a keyboard, and the user interface 1003 may further include a standard wired interface and a standard wireless interface. The network interface 1004 may include a standard wired interface and a wireless interface (such as a WI-FI interface). The memory 1005 may be a high-speed RAM memory, or may be a non-volatile memory (non-volatile memory), for example, at least one magnetic disk memory. The memory 1005 may further be at least one storage apparatus located far away from the processor 1001. As shown in FIG. 7, the memory 1005, which is used as a computer storage medium, may include an operating system, a network communications module, a user interface module, and a data recommendation application program.

In the data recommendation device 1000 shown in FIG. 7, the user interface 1003 is configured to provide an input interface for a user, to obtain data input by the user. The network interface 1004 is configured to be connected to a user terminal, to obtain data of the user terminal. The processor 1001 may be configured to invoke the data recommendation application program stored in the memory 1005, and execute the following operations:

obtaining a periodic service attribute corresponding to a terminal identifier of a user terminal and a real-time service attribute corresponding to the terminal identifier, the periodic service attribute being a first label attribute that corresponds to the terminal identifier and that is obtained through calculation according to a first service operation that is targeted for a target service and that is uploaded under the terminal identifier in a first preset period of time; and the real-time service attribute being a second label attribute that corresponds to the terminal identifier and that is obtained through calculation according to a second service operation that is targeted for the target service and that is uploaded under the terminal identifier in real time;

selecting at least one piece of recommendation service data in a service data set corresponding to the target service according to the periodic service attribute and the real-time service attribute; and sending the at least one piece of recommendation service data to the user terminal.

In an embodiment, when performing the obtaining a periodic service attribute corresponding to a terminal identifier of a user terminal and a real-time service attribute corresponding to the terminal identifier, the processor 1001 executes the following operations:

obtaining the periodic service attribute that corresponds to the terminal identifier and that is obtained through calculation by using a preset recommendation algorithm model and based on the recorded first service operation that is targeted for the target service and that is uploaded under the terminal identifier in the first preset period of time; and obtaining the real-time service attribute that corresponds to the terminal identifier and that is obtained through calculation by using a preset confidence model and based on the recorded second service operation that is targeted for the target service and that is uploaded under the terminal identifier in a second preset period of time, where the first preset period of time is greater than the second preset period of time.

In an embodiment, when performing the obtaining a periodic service attribute corresponding to a terminal identifier of a user terminal and a real-time service attribute corresponding to the terminal identifier, the processor 1001 executes the following operations:

obtaining the periodic service attribute that corresponds to the terminal identifier and that is obtained through calculation by using a preset recommendation algorithm model and based on the recorded first service operation that is targeted for the target service and that is uploaded under the terminal identifier in the first preset period of time; and obtaining the real-time service attribute that corresponds to the terminal identifier and that is obtained through calculation by using a preset confidence model and based on the recorded second service operation under the terminal identifier for historical recommendation service data.

In an embodiment, the service data set includes at least one piece of service data, and each of the at least one piece of service data has a third label attribute corresponding to each service data.

In an embodiment, when performing the selecting at least one piece of recommendation service data in a service data set corresponding to the target service according to the periodic service attribute and the real-time service attribute, the processor 1001 executes the following operations:

obtaining, in the at least one piece of service data, at least one piece of target service data whose third label attribute satisfies the periodic service attribute and the real-time service attribute;

obtaining a scoring value of each of the at least one piece of target service data according to the periodic service attribute and the real-time service attribute and by using a preset scoring model;

obtaining at least one piece of recommendation service data in the at least one piece of target service data according to magnitude of the scoring value of each target service data.

In an embodiment, when performing the obtaining, in the at least one piece of service data, at least one piece of target service data whose third label attribute satisfies the periodic service attribute and the real-time service attribute, the processor 1001 executes the following operations:

obtaining, in the at least one piece of service data, first candidate service data corresponding to a third label attribute matching the periodic service attribute;

obtaining, in the at least one piece of service data, second candidate service data corresponding to a third label attribute matching the real-time service attribute; and determining the first candidate service data and the second candidate service data as at least one piece of target service data.

In an embodiment, when performing the obtaining, in the at least one piece of service data, at least one piece of target service data whose third label attribute satisfies the periodic service attribute and the real-time service attribute, the processer 1001 executes the following operations:

obtaining, in the at least one piece of service data, third candidate service data corresponding to a third label attribute matching the periodic service attribute;

deleting, from the third candidate service data, fourth candidate service data corresponding to a third label attribute matching the real-time service attribute; and generating at least one piece of target service data according to the third candidate service data from which the fourth candidate service data is deleted.

In an embodiment, when performing the sending the at least one piece of recommendation service data to the user terminal, the processer 1001 executes the following operations:

performing sorting processing on the at least one piece of recommendation service data according to a scoring value of each of the at least one piece of recommendation service data;

dividing, according to at least one piece of recommendation service data obtained after the sorting processing, the at least one piece of recommendation service data into at least one recommendation service data set, each of the at least one recommendation service data set comprising a preset quantity of recommendation service data; and sequentially sending the at least one recommendation service data set to the user terminal when a service data recommendation request that carries the terminal identifier and that is sent by the user terminal for the target service is received.

In this embodiment of the present disclosure, a periodic service attribute of an offline layer and a real-time service attribute of a real-time layer are obtained, and recommendation service data in a service data set is selected in real time, and pushed to a user terminal. A process of generating recommendation service data in real time based on service attributes provided by an offline layer and a real-time layer is implemented, the update efficiency of the recommendation service data is improved, the effect of service data recommendation is improved, and work of service data selection of the offline layer and service data recommendation of the real-time layer is shared, thereby improving the work efficiency of the service data recommendation. The recommendation service data is selected based on the periodic service attribute and the real-time service attribute, different static and dynamic application scenarios are satisfied, and user experience is improved.

It should be noted that, in the embodiments of the present disclosure, when the data recommendation method is implemented in a form of a software functional module and sold or used as an independent product, the data recommendation method may be stored in a computer-readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a server, a network device, or the like) to perform all or some of the methods in the embodiments of the present disclosure. The foregoing storage medium includes: any medium that can store program code, such as a USB flash drive, a removable hard disk, a read-only memory (ROM), a magnetic disk, or an optical disc. In this way, the embodiments of the present disclosure are not limited to any specific combination of hardware and software.

Correspondingly, an embodiment of the present disclosure further provides a computer storage medium, the computer storage medium storing computer executable instructions, and the computer executable instructions being used to perform the data recommendation method in the embodiments of the present disclosure.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

What is disclosed above is merely an example of the embodiments of the present disclosure, and certainly is not intended to limit the protection scope of the present disclosure. Therefore, equivalent variations made in accordance with the claims of the present disclosure shall fall within the scope of the present disclosure.

INDUSTRIAL PRACTICABILITY

In the embodiments of the present disclosure, a periodic service attribute corresponding to a terminal identifier of a user terminal and a real-time service attribute corresponding to the terminal identifier are obtained, the periodic service attribute being a first label attribute that corresponds to the terminal identifier and that is obtained through calculation according to a first service operation that is targeted for a target service uploaded under the terminal identifier in a first preset period of time; and the real-time service attribute being a second label attribute that corresponds to the terminal identifier and that is obtained through calculation according to a second service operation that is targeted for the target service and that is uploaded under the terminal identifier in real time; at least one piece of recommendation service data is selected in a service data set corresponding to the target service according to the periodic service attribute and the real-time service attribute; and the at least one piece of recommendation service data is sent to the user terminal. By using the technical solutions provided in the embodiments of the present disclosure, recommendation service data may be generated in real time based on service attributes provided by an offline layer and a real-time layer, thereby improving the update efficiency of recommendation service data, and improving the recommendation effect of the service data.

What is claimed is:
1. A method, comprising:
at a plurality of servers for a content provider, each server including processors and memory, the plurality of servers organized into three architectural layers that operate on three distinct time scales, including an offline layer, an intermediate layer, and a real-time layer:
obtaining a periodic service attribute corresponding to a terminal identifier of a user terminal and a real-time service attribute corresponding to the terminal identifier,
the periodic service attribute being a first label attribute relevant for content recommendation that corresponds to the terminal identifier and that is obtained through calculation according to a first type of service operations for content of the content provider that have been performed under the terminal identifier in a first preset period of time corresponding to an update cycle of the offline layer, and
the real-time service attribute being a second label attribute relevant for content recommendation that corresponds to the terminal identifier and that is obtained through calculation according to a second type of service operations that for content of the content provider that have been performed under the terminal identifier in real time corresponding to a response time requirement of the real-time layer;
selecting at least one piece of recommended content in a content data set of the content provider according to the periodic service attribute and the real-time service attribute, wherein selection is performed in the intermediate layer with a time scale between the update cycle of the offline layer and the response time requirement of the real-time layer, and corresponding selection processes are performed on an on-demand basis for a plurality of terminal identifiers corresponding to user terminals that are currently actively engaged in interaction with the real-time layer; and
sending the at least one piece of recommended content to the user terminal as recommended content to the user of the user terminal.

2. The method according to claim 1, wherein the obtaining the periodic service attribute corresponding to the terminal identifier of the user terminal and the real-time service attribute corresponding to the terminal identifier comprises:
obtaining the periodic service attribute relevant for content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and
obtaining the real-time service attribute relevant for content recommendation that corresponds to the terminal identifier and that is obtained through calculation by using a preset confidence model and based on the recorded second type of service operations for content of the content provider that have been performed under the terminal identifier in a second preset period of time corresponding to the response time requirement of the real-time layer, wherein
the first preset period of time is orders of magnitude greater than the second preset period of time.

3. The method according to claim 1, wherein the obtaining the periodic service attribute corresponding to the terminal identifier of the user terminal and the real-time service attribute corresponding to the terminal identifier comprises:
obtaining the periodic service attribute relevant to content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and
obtaining the real-time service attribute relevant to content recommendation that corresponds to the terminal identifier and that is obtained through calculation by using a preset confidence model and based on the recorded second type of service operations under the terminal identifier for historical recommendation service data.

4. The method according to claim 1, wherein the content data set of the content provider comprises multiple pieces of content data, and each of the multiple pieces of content data has a corresponding third label attribute relevant to content recommendation; and
the selecting at least one piece of recommended content in a content data set of the content provider according to the periodic service attribute and the real-time service attribute comprises:
obtaining, in the multiple pieces of content data, at least one piece of content data whose third label attribute satisfies the periodic service attribute and the real-time service attribute;
obtaining a scoring value of each of the multiple pieces of content data according to the periodic service attribute and the real-time service attribute and by using a preset scoring model; and
obtaining at least one piece of recommended content data in the multiple pieces of content data according to magnitude of the scoring value of each piece of content data in the content data set.

5. The method according to claim 4, wherein the obtaining, in the multiple pieces of content data, at least one piece of recommended content data whose third label attribute satisfies the periodic service attribute and the real-time service attribute comprises:
obtaining, in the multiple pieces of content data, first candidate recommended content data corresponding to a respective third label attribute matching the periodic service attribute;
obtaining, in the multiple pieces of content data, second candidate recommended content data corresponding to a respective third label attribute matching the real-time service attribute; and
determining the first candidate recommended content data and the second candidate recommended content data as the at least one piece of recommended content data.

6. The method according to claim 4, wherein the obtaining, in the multiple pieces of content data, at least one piece of recommended content data whose third label attribute satisfies the periodic service attribute and the real-time service attribute comprises:
obtaining, in the multiple pieces of content data, third candidate recommended content data corresponding to a respective third label attribute matching the periodic service attribute;
deleting, from the third candidate recommended content data, fourth candidate recommended content data corresponding to a respective third label attribute matching the real-time service attribute; and
generating the at least one piece of recommended content data according to the third candidate recommended content data from which the fourth candidate recommended content data is deleted.

7. The method according to claim 4, wherein the sending the at least one piece of recommended content to the user of the user terminal comprises:
- performing sorting processing on the at least one piece of recommended content data according to a scoring value of each of the recommended content data;
- dividing, the at least one piece of recommended content data into multiple sets of recommended content data, each of the multiple sets of recommended content data comprising a preset quantity of recommended content data; and
- sequentially sending the multiple sets of recommended content data in distinct batches to the user terminal, wherein each batch is sent to the user terminal when a service data recommendation request that carries the terminal identifier and that is sent by the user terminal for the content server is received.

8. A system, comprising:
- a plurality of servers for a content provider, each server including processors and memory, the plurality of servers organized into three architectural layers that operate on three distinct time scales, including an offline layer, an intermediate layer, and a real-time layer, and the servers include a plurality of instructions stored in the memory of the plurality of servers that, when executed by the one or more processors of the servers, cause the one or more processors to perform the following operations:
  - obtaining a periodic service attribute corresponding to a terminal identifier of a user terminal and a real-time service attribute corresponding to the terminal identifier,
    - the periodic service attribute being a first label attribute relevant for content recommendation that corresponds to the terminal identifier and that is obtained through calculation according to a first type of service operations for content of the content provider that have been performed under the terminal identifier in a first preset period of time corresponding to an update cycle of the offline layer, and
    - the real-time service attribute being a second label attribute relevant for content recommendation that corresponds to the terminal identifier and that is obtained through calculation according to a second type of service operations that for content of the content provider that have been performed under the terminal identifier in real time corresponding to a response time requirement of the real-time layer;
  - selecting at least one piece of recommended content in a content data set of the content provider according to the periodic service attribute and the real-time service attribute, wherein selection is performed in the intermediate layer with a time scale between the update cycle of the offline layer and the response time requirement of the real-time layer, and corresponding selection processes are performed on an on-demand basis for a plurality of terminal identifiers corresponding to user terminals that are currently actively engaged in interaction with the real-time layer; and
  - sending the at least one piece of recommended content to the user terminal as recommended content to the user of the user terminal.

9. The system according to claim 8, wherein the obtaining the periodic service attribute corresponding to the terminal identifier of the user terminal and the real-time service attribute corresponding to the terminal identifier comprises:
- obtaining the periodic service attribute relevant for content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and
- obtaining the real-time service attribute relevant for content recommendation that corresponds to the terminal identifier and that is obtained through calculation by using a preset confidence model and based on the recorded second type of service operations for content of the content provider that have been performed under the terminal identifier in a second preset period of time corresponding to the response time requirement of the real-time layer, wherein
- the first preset period of time is orders of magnitude greater than the second preset period of time.

10. The system according to claim 8, wherein the obtaining the periodic service attribute corresponding to the terminal identifier of the user terminal and the real-time service attribute corresponding to the terminal identifier comprises:
- obtaining the periodic service attribute relevant to content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and
- obtaining the real-time service attribute relevant to content recommendation that corresponds to the terminal identifier and that is obtained through calculation by using a preset confidence model and based on the recorded second type of service operations under the terminal identifier for historical recommendation service data.

11. The system according to claim 8, wherein the content data set of the content provider comprises multiple pieces of content data, and each of the multiple pieces of content data has a corresponding third label attribute relevant to content recommendation; and
- the selecting at least one piece of recommended content in a content data set of the content provider according to the periodic service attribute and the real-time service attribute comprises:
  - obtaining, in the multiple pieces of content data, at least one piece of content data whose third label attribute satisfies the periodic service attribute and the real-time service attribute;
  - obtaining a scoring value of each of the multiple pieces of content data according to the periodic service attribute and the real-time service attribute and by using a preset scoring model; and
  - obtaining at least one piece of recommended content data in the multiple pieces of content data according to magnitude of the scoring value of each piece of content data in the content data set.

12. The system according to claim 11, wherein the obtaining, in the multiple pieces of content data, at least one piece of recommended content data whose third label attribute satisfies the periodic service attribute and the real-time service attribute comprises:

obtaining, in the multiple pieces of content data, first candidate recommended content data corresponding to a respective third label attribute matching the periodic service attribute;

obtaining, in the multiple pieces of content data, second candidate recommended content data corresponding to a respective third label attribute matching the real-time service attribute; and determining the first candidate recommended content data and the second candidate recommended content data as the at least one piece of recommended content data.

13. The system according to claim 11, wherein the obtaining, in the multiple pieces of content data, at least one piece of recommended content data whose third label attribute satisfies the periodic service attribute and the real-time service attribute comprises:

obtaining, in the multiple pieces of content data, third candidate recommended content data corresponding to a respective third label attribute matching the periodic service attribute;

deleting, from the third candidate recommended content data, fourth candidate recommended content data corresponding to a respective third label attribute matching the real-time service attribute; and generating the at least one piece of recommended content data according to the third candidate recommended content data from which the fourth candidate recommended content data is deleted.

14. The system according to claim 11, wherein the sending the at least one piece of recommended content to the user of the user terminal comprises:

performing sorting processing on the at least one piece of recommended content data according to a scoring value of each of the recommended content data;

dividing, the at least one piece of recommended content data into multiple sets of recommended content data, each of the multiple sets of recommended content data comprising a preset quantity of recommended content data; and sequentially sending the multiple sets of recommended content data in distinct batches to the user terminal, wherein each batch is sent to the user terminal when a service data recommendation request that carries the terminal identifier and that is sent by the user terminal for the content server is received.

15. A non-transitory computer-readable storage medium storing a plurality of instructions configured for execution by a plurality of servers each having one or more processors, wherein the plurality of servers provide services of a content provider, and are organized into three architectural layers that operate on three distinct time scales, including an offline layer, an intermediate layer, and a real-time layer, and the plurality of instructions cause the plurality of servers to perform the following operations:

obtaining a periodic service attribute corresponding to a terminal identifier of a user terminal and a real-time service attribute corresponding to the terminal identifier, the periodic service attribute being a first label attribute relevant for content recommendation that corresponds to the terminal identifier and that is obtained through calculation according to a first type of service operations for content of the content provider that have been performed under the terminal identifier in a first preset period of time corresponding to an update cycle of the offline layer, and the real-time service attribute being a second label attribute relevant for content recommendation that corresponds to the terminal identifier and that is obtained through calculation according to a second type of service operations that for content of the content provider that have been performed under the terminal identifier in real time corresponding to a response time requirement of the real-time layer;

selecting at least one piece of recommended content in a content data set of the content provider according to the periodic service attribute and the real-time service attribute, wherein selection is performed in the intermediate layer with a time scale between the update cycle of the offline layer and the response time requirement of the real-time layer, and corresponding selection processes are performed on an on-demand basis for a plurality of terminal identifiers corresponding to user terminals that are currently actively engaged in interaction with the real-time layer; and sending the at least one piece of recommended content to the user terminal as recommended content to the user of the user terminal.

16. The non-transitory computer-readable storage medium according to claim 15, wherein the obtaining the periodic service attribute corresponding to the terminal identifier of the user terminal and the real-time service attribute corresponding to the terminal identifier comprises:

obtaining the periodic service attribute relevant for content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and obtaining the real-time service attribute relevant for content recommendation that corresponds to the terminal identifier and that is obtained through calculation by using a preset confidence model and based on the recorded second type of service operations for content of the content provider that have been performed under the terminal identifier in a second preset period of time corresponding to the response time requirement of the real-time layer, wherein the first preset period of time is orders of magnitude greater than the second preset period of time.

17. The non-transitory computer-readable storage medium according to claim 15, wherein the obtaining the periodic service attribute corresponding to the terminal identifier of the user terminal and the real-time service attribute corresponding to the terminal identifier comprises:

obtaining the periodic service attribute relevant to content recommendation that corresponds to the terminal identifier and that is obtained through calculation by using a preset recommendation algorithm model and based on the recorded first type of service operations for content of the content provider that have been performed under the terminal identifier in the first preset period of time corresponding to the update cycle of the offline layer; and obtaining the real-time service attribute relevant to content recommendation that corresponds to the terminal identifier and that is obtained through calculation by using a preset confidence model and based on the recorded second type of service operations under the terminal identifier for historical recommendation service data.

18. The non-transitory computer-readable storage medium according to claim 15, wherein the content data set of the content provider comprises multiple pieces of content data, and each of the multiple pieces of content data has a corresponding third label attribute relevant to content recommendation; and the selecting at least one piece of recommended content in a content data set of the content provider according to the periodic service attribute and the real-time service attribute comprises:

obtaining, in the multiple pieces of content data, at least one piece of content data whose third label attribute satisfies the periodic service attribute and the real-time service attribute;

obtaining a scoring value of each of the multiple pieces of content data according to the periodic service attribute and the real-time service attribute and by using a preset scoring model; and obtaining at least one piece of recommended content data in the multiple pieces of content data according to magnitude of the scoring value of each piece of content data in the content data set.

19. The non-transitory computer-readable storage medium according to claim 18, wherein the obtaining, in the multiple pieces of content data, at least one piece of recommended content data whose third label attribute satisfies the periodic service attribute and the real-time service attribute comprises:

obtaining, in the multiple pieces of content data, first candidate recommended content data corresponding to a respective third label attribute matching the periodic service attribute;

obtaining, in the multiple pieces of content data, second candidate recommended content data corresponding to a respective third label attribute matching the real-time service attribute; and determining the first candidate recommended content data and the second candidate recommended content data as the at least one piece of recommended content data.

20. The non-transitory computer-readable storage medium according to claim 19, wherein the obtaining, in the multiple pieces of content data, at least one piece of recommended content data whose third label attribute satisfies the periodic service attribute and the real-time service attribute comprises:

obtaining, in the multiple pieces of content data, third candidate recommended content data corresponding to a respective third label attribute matching the periodic service attribute;

deleting, from the third candidate recommended content data, fourth candidate recommended content data corresponding to a respective third label attribute matching the real-time service attribute; and generating the at least one piece of recommended content data according to the third candidate recommended content data from which the fourth candidate recommended content data is deleted.

* * * * *